(12) United States Patent
Duan et al.

(10) Patent No.: US 10,939,059 B2
(45) Date of Patent: Mar. 2, 2021

(54) GLOBAL SHUTTER CMOS PIXEL CIRCUIT AND IMAGE CAPTURING METHOD THEREOF

(71) Applicants: SHANGHAI IC R&D CENTER CO., LTD., Shanghai (CN); CHENGDU IMAGE DESIGN TECHNOLOGY CO. LTD., Chengdu (CN)

(72) Inventors: Jiebin Duan, Shanghai (CN); Zheng Ren, Shanghai (CN); Yu Jiang, Shanghai (CN); Jianxin Wen, Shanghai (CN); Changming Pi, Shanghai (CN)

(73) Assignees: SHANGHAI IC R&D CENTER CO., LTD, Shanghai (CN); CHENGDU IMAGE DESIGN TECHNOLOGY CO. LTD., Chengdu (CN)

( * ) Notice: Subject to any disclaimer, the term of this patent is extended or adjusted under 35 U.S.C. 154(b) by 0 days.

(21) Appl. No.: 16/465,218

(22) PCT Filed: Nov. 22, 2017

(86) PCT No.: PCT/CN2017/112353
§ 371 (c)(1),
(2) Date: May 30, 2019

(87) PCT Pub. No.: WO2018/099305
PCT Pub. Date: Jun. 7, 2018

(65) Prior Publication Data
US 2020/0007801 A1    Jan. 2, 2020

(30) Foreign Application Priority Data
Nov. 30, 2016   (CN) .................. 201611090316.X

(51) Int. Cl.
*H04N 5/355*    (2011.01)
*H04N 5/378*    (2011.01)
(Continued)

(52) U.S. Cl.
CPC ....... *H04N 5/35545* (2013.01); *H04N 5/3698* (2013.01); *H04N 5/374* (2013.01); *H04N 5/378* (2013.01)

(58) Field of Classification Search
CPC .. H04N 5/35545; H04N 5/374; H04N 5/3698; H04N 5/37452; H04N 5/35518;
(Continued)

(56) References Cited
U.S. PATENT DOCUMENTS

2002/0190188 A1* 12/2002 Machida .............. H04N 5/3575
250/208.1
2005/0057675 A1*  3/2005 Lee ....................... H04N 5/363
348/308

(Continued)

*Primary Examiner* — Abdelaaziz Tissire
(74) *Attorney, Agent, or Firm* — Tianchen LLC.; Yuan R. Li; Yi Fan Yin

(57) ABSTRACT

The present disclosure provides a global shutter CMOS pixel circuit and its image capturing method. The global shutter CMOS pixel circuit comprising a power supply unit, a pixel signal generating unit, a signal sampling and holding unit and a signal outputting unit. An output of the pixel signal generating unit is connected to an input of the signal sampling and holding unit. An output of the signal sampling and holding unit is connected to an input of the signal outputting unit. The output signal of the pixel and the photo-generated current are set to a logarithmic relationship, which effectively increases the signal dynamic range. Therefore, image signal transmission with high speed and high dynamic range can be achieved simultaneously. Furthermore, the pixels in the present disclosure can eliminate the process variations, which increases the consistency of the pixels.

3 Claims, 1 Drawing Sheet

(51) Int. Cl.
*H04N 5/374* (2011.01)
*H04N 5/369* (2011.01)

(58) Field of Classification Search
CPC ............... H04N 5/2353; H04N 5/3745; H04N 5/335–378; H01L 27/288
See application file for complete search history.

(56) References Cited

U.S. PATENT DOCUMENTS

| | | | |
|---|---|---|---|
| 2006/0261246 A1* | 11/2006 | Krymski | H04N 5/3653 250/208.1 |
| 2008/0210846 A1* | 9/2008 | Andrews | H01L 27/14623 250/201.1 |
| 2009/0045319 A1* | 2/2009 | Sugawa | H04N 5/37452 250/208.1 |
| 2009/0256940 A1* | 10/2009 | Pahr | H04N 5/3698 348/308 |
| 2010/0271517 A1* | 10/2010 | De Wit | H04N 5/378 348/294 |
| 2010/0277622 A1* | 11/2010 | Fossum | H04N 5/378 348/241 |
| 2013/0001403 A1* | 1/2013 | Yamakawa | H01L 27/14609 250/208.1 |
| 2014/0183338 A1* | 7/2014 | Fossum | H04N 5/3745 250/208.1 |
| 2016/0316160 A1* | 10/2016 | Kurokawa | H04N 5/3698 |
| 2017/0048469 A1* | 2/2017 | Xiong | H04N 5/3745 |
| 2017/0078608 A1* | 3/2017 | Kurokawa | H01L 27/14632 |
| 2017/0150017 A1* | 5/2017 | Geurts | H04N 5/372 |
| 2018/0091754 A1* | 3/2018 | Okura | H04N 5/378 |
| 2018/0213174 A1* | 7/2018 | Sano | H01L 31/10 |
| 2019/0058058 A1* | 2/2019 | Liu | H01L 29/765 |

\* cited by examiner

GLOBAL SHUTTER CMOS PIXEL CIRCUIT AND IMAGE CAPTURING METHOD THEREOF

CROSS-REFERENCE TO RELATED APPLICATIONS

This application claims priority of International Patent Application Serial No. PCT/CN2017/112353, filed Nov. 22, 2017, which is related to and claims priority of Chinese patent application Serial No. 201611090316.X, filed Nov. 30, 2016. The entirety of each of the above-mentioned patent applications is hereby incorporated herein by reference and made a part of this specification.

TECHNICAL FIELD

The present disclosure generally relates to the field of image sensors, more particularly, to a global shutter CMOS pixel circuit and image capturing method.

BACKGROUND

Global shutter CMOS image sensors are widely applied in the fields of monitoring, scientific applications, industrial vision, etc. due to its advantage of high data transmission rate. Currently, there exists increasingly demanding for the image sensors of high speed and high dynamic imaging in many applications.

The conventional global shutter CMOS image sensor cannot provide images of high dynamic range by one-time exposure. Although integrating images by multiple exposures may achieve high dynamic image, it requires complicated mathematical algorithms which greatly decreases the frame rate and weakens the characteristic of high speed imaging of the global shutter pixels.

SUMMARY

Accordingly, an objective of the present disclosure is to provide a global shutter CMOS pixel circuit with high dynamic range to increase the data transmission rate of the global shutter pixel.

To achieve the above purposes, the present disclosure provides a global shutter CMOS pixel circuit comprising a power supply unit, a pixel signal generating unit, a signal sampling and holding unit, and a signal outputting unit. The power supply unit is connected to the pixel signal generating unit, the signal sampling and holding unit, and the signal outputting unit. An output of the pixel signal generating unit is connected to an input of the signal sampling and holding unit. An output of the signal sampling and holding unit is connected to an input of the signal outputting unit.

The pixel signal generating unit comprises: a first current source, a second current source, a first control terminal, a second control terminal, a bias voltage terminal, a column selection terminal, a photodiode, a first transistor, a second transistor, a third transistor, a fourth transistor, a fifth transistor. The drain of the first transistor is connected to the positive electrode of the power supply unit; the gate of the first transistor is connected to the bias voltage terminal; the source of the first transistor is connected to the drain of the second transistor, the drain of the third transistor, the source of the fourth transistor at a node. The source of the second transistor is connected to cathode of the photodiode, the gate of the second transistor is connected to the column selection terminal. The anode of the photodiode is connected to the negative electrode of the power supply unit. The source of the third transistor is connected to the positive electrode of the first current source, the gate of the third transistor is connected to the first control terminal. The other electrode of the first current source is connected to the negative electrode of the power supply unit. The drain of the fourth transistor is connected to the gate of the fifth transistor, the gate of the fourth transistor is connected to the second control terminal. The drain of the fifth transistor is connected to the positive electrode of the power supply unit, the source of the fifth transistor is connected to the positive electrode of the second current source and is the output of the pixel signal generating unit. The other electrode of the second current source is connected to the negative electrode of the power supply unit.

Preferably, the signal sampling and holding unit comprises a sixth transistor, a seventh transistor, a first capacitor, a second capacitor, a third control terminal and a fourth control terminal. The source of the sixth transistor as the input of the signal sampling and holding unit is connected to the source of the fifth transistor, the drain of the sixth transistor is connected to the source of the seventh transistor and one end of the first capacitor, the gate of the sixth transistor is connected to the third control terminal. The drain of the seventh transistor is connected to one end of the second capacitor and is the output of the signal sampling and holding unit, the gate of the seventh transistor is connected to the fourth control terminal. The other end of the first capacitor and the other end of the second capacitor are connected to the negative electrode of the power supply unit.

Preferably, the first transistor, the second transistor, the third transistor, the fourth transistor, the fifth transistor, the sixth transistor, and the seventh transistor are NMOS transistors.

Preferably, the signal outputting unit comprises an eighth transistor, a ninth transistor, a third current source and a row selection terminal. The gate of the eighth transistor as the input of the signal outputting unit is connected to the drain of the seventh transistor, the drain of the eighth transistor is connected to the positive electrode of the power supply unit, the source of the eighth transistor is connected to the source of the ninth transistor. The drain of the ninth transistor is connected to the positive electrode of the third current source and is the output of the signal outputting unit, the gate of the ninth transistor is connected to the row selection terminal. The other electrode of the third current source is connected to the negative electrode of the power supply unit.

Preferably, the eighth transistor is an NMOS transistor.

To achieve the above purposes, the present disclosure also provides an image capturing method by using the above-mentioned global shutter CMOS pixel circuit. The method comprises the following steps:

S01: exposing the photodiode to photons, then turning on the fourth transistor after the exposure;

S02: turning on the second transistor, the sixth transistor, the seventh transistor, at this time the first transistor works in preset sub-threshold region; then, turning off the seventh transistor, the second capacitor keeps a first voltage;

S03: turning on the third transistor, at this time, the first transistor works in saturation region; then, turning off the sixth transistor, the first capacitor keeps a second voltage;

S04: turning off the second transistor and the third transistor, then turning off the fourth transistor;

S05: turning on the ninth transistor, the signal outputting unit outputs a first output voltage; then, turning on the seventh transistor, the signal outputting unit outputs a second output voltage;

S06: turning off the seventh transistor, then turning off the ninth transistor, such that a readout of image signal is accomplished.

According to the present disclosure, the output signal of the pixel and the photo-generated current are set to have a logarithmic relationship, which effectively increases the signal dynamic range. Therefore, image signal transmission with high speed and high dynamic range can be achieved simultaneously. Furthermore, the pixels in the present disclosure can eliminate the process variations, which increases the consistency of the pixels.

DETAILED DESCRIPTION

The present disclosure will now be descried more fully hereinafter with reference to the accompanying drawings. It will be understood that various changes in form and details may be made herein without departing from the spirit and scope of the invention; and the embodiments and drawings are substantially used for illustrating the invention and should not be used as limitation to the present disclosure.

The present disclosure will now be descried more fully hereinafter with reference to FIG. 1-FIG. 2. It should be noted that the drawings are not necessarily to scale, emphasis instead being placed upon illustrating the principles of the present disclosure.

Figure 1:
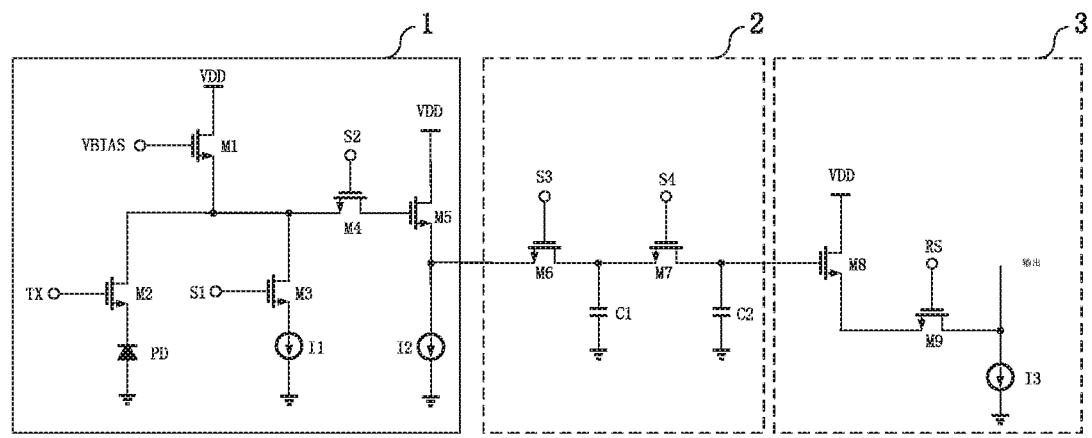
FIG. 1 is a circuit diagram of a global shutter CMOS pixel circuit with high dynamic range according to a preferred embodiment of the present disclosure.

Referring to FIG. 1, the global shutter CMOS pixel circuit according to the embodiment comprises a power supply unit, a pixel signal generating unit 1, a signal sampling and holding unit 2 and a signal outputting unit 3. The power supply unit is connected to the pixel signal generating unit 1, the signal sampling and holding unit 2 and the signal outputting unit 3. An output of the pixel signal generating unit 1 is connected to an input of the signal sampling and holding unit 2. An output of the signal sampling and holding unit 2 is connected to an input of the signal outputting unit 3.

The pixel signal generating unit 1 comprises: a first current source I1, a second current source I2, a first control terminal S1, a second control terminal S2, a bias voltage terminal BIAS, a column selection terminal TX, a photodiode PD, a first transistor M1, a second transistor M2, a third transistor M3, a fourth transistor M4, a fifth transistor M5. The drain of the first transistor M1 is connected to the positive electrode VDD of the power supply unit; the gate of the first transistor M1 is connected to the bias voltage terminal BIAS; the source of the first transistor M1 is connected to the drain of the second transistor M2, the drain of the third transistor M3, the source of the fourth transistor M4 at a node. The source of the second transistor M2 is connected to cathode of the photodiode PD, the gate of the second transistor M2 is connected to the column selection terminal TX. The anode of the photodiode PD is connected to the negative electrode VSS of the power supply unit. The source of the third transistor M3 is connected to the positive electrode of the first current source I1, the gate of the third transistor M3 is connected to the first control terminal S1. The other electrode of the first current source I1 is connected to the negative electrode VSS of the power supply unit. The drain of the fourth transistor M4 is connected to the gate of the fifth transistor M5, the gate of the fourth transistor M4 is connected to the second control terminal S2. The drain of the fifth transistor M5 is connected to the positive electrode VDD of the power supply unit, the source of the fifth transistor M5 is connected to the positive electrode of the second current source I2 and is the output of the pixel signal generating unit. The other electrode of the second current source I2 is connected to the negative electrode VSS of the power supply unit.

The signal sampling and holding unit 2 comprises a sixth transistor M6, a seventh transistor M7, a first capacitor C1, a second capacitor C2, a third control terminal S3 and a fourth control terminal S4. The source of the sixth transistor M6 as the input of the signal sampling and holding unit 2 is connected to the source of the fifth transistor M5, the drain of the sixth transistor M6 is connected to the source of the seventh transistor M7 and one end of the first capacitor C1, the gate of the sixth transistor M6 is connected to the third control terminal S3. The drain of the seventh transistor M7 is connected to one end of the second capacitor C2 and is the output of the signal sampling and holding unit 2, the gate of the seventh transistor M7 is connected to the fourth control terminal S4. The other end of the first capacitor C1 and the other end of the second capacitor C2 are connected to the negative electrode VSS of the power supply unit.

Herein, the first transistor M1, the second transistor M2, the third transistor M3, the fourth transistor M4, the fifth transistor M5, the sixth transistor M6, and the seventh transistor M7 are all NMOS transistors.

The signal outputting unit 3 comprises an eighth transistor M8, a ninth transistor M9, a third current source I3 and a row selection terminal RS. The gate of the eighth transistor M8 as the input of the signal outputting unit 3 is connected to the drain of the seventh transistor M7, the drain of the eighth transistor M8 is connected to the positive electrode VDD of the power supply unit, the source of the eighth transistor M8 is connected to the source of the ninth transistor M9. The drain of the ninth transistor M9 is connected to the positive electrode of the third current source I3 and is the output of the signal outputting unit 3, the gate of the ninth transistor M9 is connected to the row selection terminal RS. The other electrode of the third current source I3 is connected to the negative electrode VSS of the power supply unit.

Figure 2:
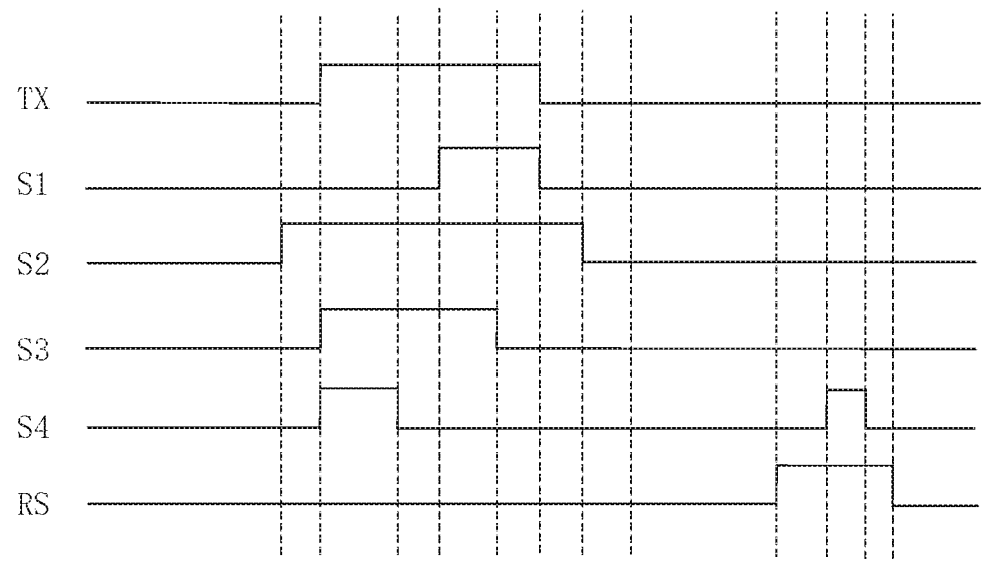
FIG. 2 is a sequence diagram of an image capturing method according to a preferred embodiment of the present disclosure.

Pleas referring to FIG. 2 and FIG. 1, the image capturing method by using the above-mentioned global shutter CMOS pixel circuit comprises the following steps:

S01: exposing the photodiode to photons, then turning on the fourth transistor after the exposure;

S02: turning on the second transistor, the sixth transistor, the seventh transistor, at this time the first transistor works in preset sub-threshold region; then, turning off the seventh transistor, at this time, the second capacitor keeps a first voltage;

Specifically, in the step S02, when the first transistor works in sub-threshold region, the source voltage of the fifth transistor equals to the first voltage.

The first voltage is calculated as follows:

$$V_a = V_{bias} - V_{th,M1} - nV_t \ln\left(\frac{I_P + I_L}{I_0}\right) - \sqrt{\frac{2I_{bias}}{\beta_5}} - V_{th,M5} \qquad (1)$$

Wherein, $V_a$ is the value of the first voltage, $V_{bias}$ is the bias voltage, $I_{bias}$ is the bias current, $V_{th,M1}$ is the threshold voltage of the first transistor, $V_{th,M5}$ is the threshold voltage of the fifth transistor, n is the ideal sub-threshold factor, $I_0$ is the drain current when the gate-source voltage of a MOSFET is equal to its threshold voltage; $V_t$ is the thermal potential, $I_p$ is the photo-generated current of the photodiode, $I_L$ is the reverse photo-generated current of the photodiode, $\beta_5 = uC_{ox}$, u is the carrier mobility, $C_{ox}$ is the gate oxide capacitance per unit area.

S03: turning on the third transistor, at this time, the first transistor works in saturation region; then, turning off the sixth transistor, at this time the first capacitor keeps a second voltage;

Specifically, in the step S03, when the first transistor works in saturation region, the source voltage of the fifth transistor equals to the second voltage.

The second voltage is calculated as follows:

$$V_b = V_{bias} - V_{th,M1} - \sqrt{\frac{2I_1}{\beta_1}} - \sqrt{\frac{2I_2}{\beta_3}} - V_{th,M5} \quad (2)$$

Wherein, $V_b$ is the value of the second voltage, $V_{bias}$ is the bias voltage, $I_1$ is the current of the first current source, $I_2$ is the current of the second current source, $V_{th,M1}$ is the threshold voltage of the first transistor, $V_{th,M5}$ is the threshold voltage of the fifth transistor, $\beta_1 = u_1 C_{ox}$, $\beta_5 = u_5 C_{ox}$, $u_1$ is the carrier mobility of the first transistor, $u_5$ is the carrier mobility of the fifth transistor, $C_{ox}$ is the gate oxide capacitance per unit area.

S04: turning off the second transistor and the third transistor, then turning off the fourth transistor;

S05: turning on the ninth transistor, the signal outputting unit outputs a first output voltage; then, turning on the seventh transistor, the signal outputting unit outputs a second output voltage;

Specifically, the first output voltage equals to the first voltage. The second output voltage is calculated as: $V2 = (V_a \cdot C2 + V_b \cdot C1)/(C1+C2)$. Wherein, $V_a$ is the value of the first voltage, C2 is the value of the second capacitor, $V_b$ is the value of the second voltage, C1 is the value of the first capacitor.

S06: turning off the seventh transistor, then turning off the ninth transistor, such that a readout of image signal is accomplished.

After reading out and outputting the image signal to a peripheral circuit, the image signal is further processed. From the above equations (1), (2), it is known that the threshold voltage of the fifth transistor affects both the first voltage and the second voltage. In addition, since the first output voltage equals to the first voltage, the second output voltage has relationship with the first voltage, the threshold voltage of the fifth transistor also affects the first output voltage and the second output voltage, and accordingly affects the image signal. Therefore, the second output voltage can be subtracted from the first output voltage to avoid the influence of the threshold voltage of the fifth transistor. The specific principle will be described as follows:

The difference value of the first voltage $V_a$ and the second voltage $V_b$ is:

$$V_a - V_b = nV_t \ln\left(\frac{I_p + I_L}{I_0}\right) + \sqrt{\frac{2I_1}{\beta_1}}$$

Since the first output voltage equals to the first voltage as: Vout1=$V_a$, the second output voltage is calculated as: Vout2=$(V_a \cdot C2 + V_b \cdot C1)/(C1+C2)$, then when C1=C2, Vout2=$(V_a+V_b)/2$, and Vout1−Vout2=$(V_a−V_b)/2$.

Therefore, the subsequent image processing circuit can avoid the influence of the threshold voltage of the fifth transistor to the image signal by subtracting the second output voltage Vout2 from the first output voltage Vout1, thereby effectively increasing the consistency of the image signal outputted by the pixel array.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An image capturing method of a global shutter CMOS pixel circuit, wherein global shutter CMOS pixel circuit comprises: a power supply unit, a pixel signal generating unit, a signal sampling and holding unit and a signal outputting unit; wherein the power supply unit is connected to the pixel signal generating unit, the signal sampling and holding unit, and the signal outputting unit; an output of the pixel signal generating unit is connected to an input of the signal sampling and holding unit; an output of the signal sampling and holding unit is connected to an input of the signal outputting unit;

the pixel signal generating unit comprises: a first current source, a second current source, a first control terminal, a second control terminal, a bias voltage terminal, a column selection terminal, a photodiode, a first transistor, a second transistor, a third transistor, a fourth transistor, a fifth transistor; wherein, the drain of the first transistor is connected to the positive electrode of the power supply unit; the gate of the first transistor is connected to the bias voltage terminal; the source of the first transistor is connected to the drain of the second transistor, the drain of the third transistor, the source of the fourth transistor at a node; the source of the second transistor is connected to cathode of the photodiode, the gate of the second transistor is connected to the column selection terminal; the anode of the photodiode is connected to the negative electrode of the power supply unit; the source of the third transistor is connected to the positive electrode of the first current source, the gate of the third transistor is connected to the first control terminal; the other electrode of the first current source is connected to the negative electrode of the power supply unit; the drain of the fourth transistor is connected to the gate of the fifth transistor, the gate of the fourth transistor is connected to the second control terminal; the drain of the fifth transistor is connected to the positive electrode of the power supply unit, the source of the fifth transistor is connected to the positive electrode of the second current source and is the output of the pixel signal generating unit; the other electrode of the second current source is connected to the negative electrode of the power supply unit;

the signal sampling and holding unit comprises a sixth transistor, a seventh transistor, a first capacitor, a second capacitor, a third control terminal and a fourth control terminal; the source of the sixth transistor as the input of the signal sampling and holding unit is connected to the source of the fifth transistor, the drain of the sixth transistor is connected to the source of the seventh transistor and one end of the first capacitor, the gate of the sixth transistor is connected to the third control terminal; the drain of the seventh transistor is connected to one end of the second capacitor and is the output of the signal sampling and holding unit, the gate of the seventh transistor is connected to the fourth control terminal; the other end of the first capacitor and the other end of the second capacitor are connected to the negative electrode of the power supply unit;

the signal outputting unit comprises an eighth transistor, a ninth transistor, a third current source and a row selection terminal; the gate of the eighth transistor as the input of the signal outputting unit is connected to the drain of the seventh transistor, the drain of the eighth transistor is connected to the positive electrode of the power supply unit, the source of the eighth transistor is connected to the source of the ninth transistor; the drain of the ninth transistor is connected to the positive electrode of the third current source and is the output of the signal outputting unit, the gate of the ninth transistor is connected to the row selection terminal; the other electrode of the third current source is connected to the negative electrode of the power supply unit;

the image capturing method comprises:

S01: exposing the photodiode to photons, then turning on the fourth transistor after the exposure;

S02: turning on the second transistor, the sixth transistor, the seventh transistor, at this time the first transistor works in preset sub-threshold region; then, turning off the seventh transistor, the second capacitor remains at a first voltage;

S03: turning on the third transistor, at this time, the first transistor works in saturation region; then, turning off the sixth transistor, the first capacitor remains at a second voltage;

S04: turning off the second transistor and the third transistor, then turning off the fourth transistor;

S05: turning on the ninth transistor, the signal outputting unit outputs a first output voltage; then, turning on the seventh transistor, the signal outputting unit outputs a second output voltage;

S06: turning off the seventh transistor, then turning off the ninth transistor, such that a readout of image signal is accomplished.

2. The image capturing method of claim 1, wherein the first transistor, the second transistor, the third transistor, the fourth transistor, the fifth transistor, the sixth transistor, and the seventh transistor are NMOS transistors.

3. The image capturing method of claim 1, wherein eighth transistor is an NMOS transistor.

* * * * *